United States Patent [19]

MacDonald

[11] Patent Number: 5,045,171

[45] Date of Patent: Sep. 3, 1991

[54] ACID EFFICIENT MEMBRANE FOR USE IN ELECTRODIALYSIS FOR RECOVERY OF ACID

[75] Inventor: Russell J. MacDonald, Watertown, Mass.

[73] Assignee: Ionics, Incorporated, Watertown, Mass.

[21] Appl. No.: 393,334

[22] Filed: Aug. 14, 1989

Related U.S. Application Data

[63] Continuation-in-part of Ser. No. 337,203, Apr. 12, 1989, which is a continuation of Ser. No. 177,727, Apr. 5, 1988, Pat. No. 4,822,471.

[51] Int. Cl.$^5$ .............................................. C25B 13/08
[52] U.S. Cl. .................... 204/296; 204/301; 204/252; 521/27
[58] Field of Search ................ 204/301, 182.4, 296, 204/252; 521/27

[56] References Cited

U.S. PATENT DOCUMENTS

| | | | |
|---|---|---|---|
| 4,167,551 | 9/1979 | Tamura et al. | 521/27 |
| 4,294,933 | 10/1981 | Kihara et al. | 521/27 |
| 4,374,720 | 2/1983 | MacDonald | 204/252 |
| 4,587,269 | 5/1986 | Thomas, Jr. | 521/38 |
| 4,769,152 | 9/1988 | Igawa et al. | 210/638 |
| 4,789,443 | 12/1988 | deNora et al. | 204/98 |

*Primary Examiner*—John Niebling
*Assistant Examiner*—Arun S. Phasge
*Attorney, Agent, or Firm*—Norman E. Saliba

[57] ABSTRACT

In contrast to prior art conventional anion selective membranes, the membranes of this invention have a low transport number for hydrogen ions (e.g. $t_{H+} \leq 0.3$) and a high transport number for low ionic weight anions (e.g. $t_{A-} \geq 0.7$) in acid solutions (e.g. 0.5 to 1.0 gram-equivalents H+ per liter). As compared to such prior art membranes, those of this invention have a critically lower ratio of water content to anion exchange capacity.

6 Claims, No Drawings

5,045,171

ACID EFFICIENT MEMBRANE FOR USE IN ELECTRODIALYSIS FOR RECOVERY OF ACID

This application is a continuation-in-part of U.S. Patent Application 07/337,203 filed Apr. 12, 1989 (now abandoned) which in turn is a continuation of U.S. Pat. No. 4,822,471 issued Apr. 18, 1989.

BACKGROUND OF THE INVENTION

1) Field of the Invention

This invention relates to anion selective membranes useful in electrodialysis apparatus for recovering concentrated acids having low ionic weight anions from dilute, aqueous acid solutions which may also contain, for example, salts, organic compounds, polymers (such as proteins) and/or colloids. Such membranes have a high current efficiency for such anions (generally greater than about 70 percent) and a low electrical resistance in acid solutions (typically less than 30 ohm cm$^2$).

2) Comparison with the Prior Art

The anion selective membranes of this invention, compared to prior art anion selective membranes, substantially retard the passage of hydrogen ions when in contact with acid solutions and under the influence of a suitable, applied, direct current potential. With the anion selective membranes of this invention, one can efficiently concentrate or deacidify acidic solutions in electrodialysis apparatus.

Commercially available anion selective membranes (such as, for example, those described in U.S. Pat. No. 4,231,855) permit substantial passage of hydrogen ions when they are used for electrodialysis of acid solutions, resulting in low anion current efficiency and therefore high capital and operating costs. For example when typical prior art anion selective membranes separate 0.5 and 1.0 normal solutions of hydrochloric acid at room temperature, then more than 30 percent of the electric current can be carried by hydrogen ions, i.e. less than 70 percent of the current carried by chloride ions. Such disadvantages have severely limited the applications of electrodialysis for the processing of acidic solutions.

The novel membranes of the present invention are useful for the electrodialytic recovery of acid solutions which become "spent", i.e. when, through use, the salt concentration becomes too high and/or the acid concentration is or becomes too low. Such acid/salt solutions are encountered, for example, in the metal finishing, pickling, plating and mining industries. At present such acid/salt solutions often constitute waste disposal problems in such industries since there are few, if any, efficient processes for recovering such acid at useful concentrations from such solutions.

SUMMARY OF THE INVENTION

An objective of this invention is to provide low cost, stable anion selective membranes having low transport numbers for hydrogen ions, (e.g. $t_{H+} \leq 0.3$), high transport numbers (e.g. $t_{A-} \leq 0.7$) for low ionic weight anions (such as chloride, bromide, nitrate,) and a low electrical resistance typically less than about 30 ohm cm$^2$ at about room temperature), said membranes being useful for the separation and recovery of acids from aqueous mixtures of said acids with other substances and also for the recovery of concentrated acids from acidic waste streams.

Another objective of this invention is to provide electrodialysis apparatus for efficiently recovering acids from aqueous streams in which said acids occur.

These and other objectives will become clear from the following description of the invention and from the appended claims.

According to this invention the above and other objectives are obtained by forming an anion selective membrane characterized by having at least a laterally continuous portion of its thickness (e.g. a surface, a surface region or a plane parallel to the surface) which laterally continuous portion is dense (i.e. not macroreticular) and has a water content of not more than about 5 mols per equivalent of anion exchange capacity when in equilibrium at room temperature with about 0.01N hydrochloric acid and preferably not less than about 2 mols. By way of comparison, typical commercially available anion selective membranes are found to have the following water contents in the same units (see for example Perry's Chemical Engineers' Handbook 6th Ed, McGraw-Hill, NY, (1984) page 17-40):

| Manufacturer | Type | Water Content* |
|---|---|---|
| 1. AMF Inc. | A-60 | 10 |
| Springdale, CT, U.S.A. | A-100 | 7 |
| 2. Asahi Glass Co. | AMV | 8 |
| Tokyo, Japan | | |
| 3. Ionac Chem. Div. | MA-3148 | 12 |
| Birmingham, NJ, U.S.A. | | |
| 4. Ionics, Inc. | AR111-BZL | 23 |
| Watertown, MA, U.S.A. | AR111-EZL | 18 |
| | AR102 | 12 |
| | AR103PZL | 26 |
| | AR103QZL | 15 |
| | AR204PZL | 25 |
| | AR204SXZL | 22 |
| | AR204UZL | 11 |
| 5. Negev Institute | PE-A-1 | 16 |
| Beersheva, Israel | CL-A-1 | 6 |
| 6. Tokuyama Soda Co. | AV-4T | 8 |
| Tokyo, Japan | AF-4T | 8 |
| | AVS-4T | 9 |
| | AFS-4T | 9 |
| | ACH-45 T | 9 |
| | ACS | 8 |
| | AFN | 10 |
| | ACLE-5P | 8 |
| 7. Asahi Chemical Industry | A-162 | 7 |
| Tokyo, Japan | | |

*moles per equivalent of capacity.

By way of further comparison, the data of Table I U.S. Pat. No. 4,231,855 show water contents in the range of 11 to 24 moles per equivalent of capacity and the examples thereof pertaining to anion selective membranes also show water contents in the range of 11 to 24 mols per equivalent.

As an additional comparison, the data of U.S. Pat. No. 4,052,343 show water contents in the range of 22 to 67 mols of water per equivalent anion exchange capacity. The latter patent pertains to granular macroporous (macroreticular) anion exchange resins which resins are not useful for electrodialysis since the macro-porosity leads to low current efficiencies in electrodialysis.

All such prior art membranes have current efficiencies of less than about 70 percent when measured as set forth in Example 2 below whereas, anion selective membranes made according to the present invention with water contents of not more than about 5 mols per equivalent of anion exchange capacity, have current efficiencies of in excess of about 70 percent in the same test. It should be noted that the membrane type AFN in the above list is recommended for the diffusion-dialysis separation of mineral acids from their salts, i.e. the membrane is in fact highly permeable to hydrogen ions.

The whole membrane, continuous interior plane, surface region or surface which according to this invention has a water content of not more than about 5 moles per equivalent of anion exchange capacity is subject to swelling from osmotic pressure when it is in contact with dilute acid solutions. Such swelling may be restrained by incorporating a suitable amount of crosslink in the polymers constituting the membrane; by providing a suitable amount of microcrystallinity in said polymers; by diluting the monomers and/or polymers having anion exchanging groups with monomers and/or polymers not having such groups (including bonding or grafting such polymers having anion exchanging groups to said polymers not having such groups, for example by radiation); and/or by reinforcing the membrane with fabric. It is preferred however that the anion exchange capacity of such whole membrane, continuous interior plane, surface region or surface (which has a water content of not more than about 5 moles per equivalent) should not be less than about 0.5 milliequivalent per dry gram in order that the electrical resistance of the membrane be suitably low.

Suitable membranes according to this invention can be, for example, fabric reinforced sheets comprising continuous planar regions of highly cross-linked, low water content, high anion exchange capacity hydrocarbon polymers. Such polymers can be any condensation and/or addition polymer or combinations thereof which can be formed into continuous planar regions having the requisite water content of not more than about 5 mols per equivalent of anion exchange capacity in equilibrium with about 0.01N hydrochloric acid and which are relatively stable under the acid conditions of use. Examples of suitable anion exchange groups have base form ionization constants in excess of about $10^{-12}$ and include primary, secondary, tertiary and/or quaternary amines, sulfonium, phosphonium, guanidinium, dicyandiamidine. Examples of suitable condensation polymers include: metaphenylenediamine (and/or toluene diamine and/or xylylene diamine)-co-polyethylene polyamine-co-formaldehyde; guanidine-co-melamine-co-formaldehyde; N-methyl-parahydroxybenzylamine-co-formaldehyde; polyethylene polyamine-co-formaldehyde; dodecamethylene diamine-co-formaldehyde; and blends of the above with for example phthalic anhydride-co-ethylene glycol. Other suitable condensation polymers include those resulting from the reaction of one or more amines from Group I with one or more crosslinking (insolubilizing) agents from Group II:

Group I: epichlorohydrin-co-ethylene diamine; polyethylenimine; polyvinylamine (prepared for example from polytertiary butyl-N-vinyl carbamate); polyaminostyrene Group II: trimesoyl-chloride; isophthaloyl chloride; trimelletic anhydride acid chloride; bis (chloromethyl benzene (xylylene dichloride). Generally the condensation polymers are preferably prepared in a two-step process, first preparing an essentially linear condensate, preferably coating a suitable substrate (fabric or microporous diaphragm) with such first stage product and then curing to the final crosslinked, i.e. insolubilized state. Preferred polycondensates are those which are tough rather than brittle.

Examples of mixed condensation or addition polymers include the epihalohydrin-amine polymers such as epichlorohydrin-co-bisphenol A-co-piperazine; epichlorohydrin-co-cresol novoloc-co-polyethylenimine; tetraglycidyl methylene dianiline polymers. It is obvious that if, as preferred, the glycidyl ethers are formed as a first step then the crosslinking step will be essentially only an additive reaction.

Suitable addition polymers for the anion selective membranes and/or laterally continuous planes thereof may be prepared for example from toluene diisocyanate, methylene bis (phenyl isocyanate), polymethylene bis (phenyl isocyanate), naphthalene diisocyanate and/or bitolylene diisocyanate on the one hand and a polyfunctional amine such as one or more of those from Group I mentioned above.

The polymers may also, for example, be prepared by an additive reaction from one or more monoethylenic functional monomers such as:

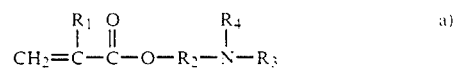

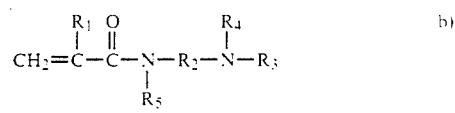

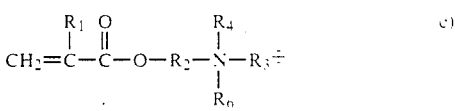

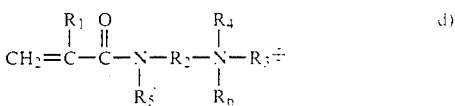

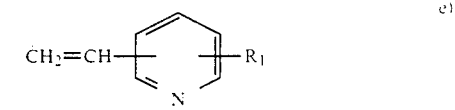

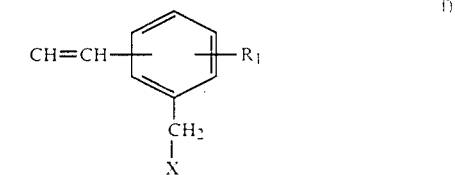

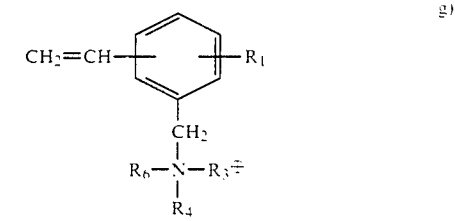

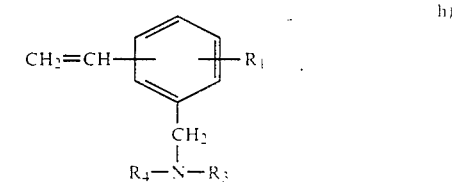

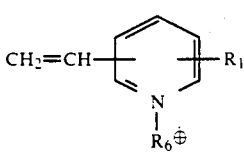

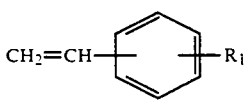

where:
R$_1$ may be hydrogen or an alkyl or alkoxy moiety
R$_2$ is an alkyl group such as ethyl or propyl
R$_3$ and R$_4$ may individually be hydrogen and/or alkyl groups such as methyl
R$_5$ may be hydrogen or an alkyl or alkoxy group
R$_6$ may be hydrogen or an alkyl group
X is a suitably halide moiety such as bromide or chloride.

Other useful monoethylenic functional monomers include: paraaminostyrene; tertiary butyl N-vinyl carbamate; N,N-dimethy allylamine; 2-vinyl-4, 6-diamino-s-triazine.

Such functional ethylenic monomers may be crosslinked, for example, with one or more crosslinking monomers each containing two or more ethylenic groups. Fortunately a broad variety of such crosslinking monomers are now available. Representative are:
divinyl benzenes
divinyl pyridines*
diallyl amine*
dimethyl diallyl ammonium chloride*

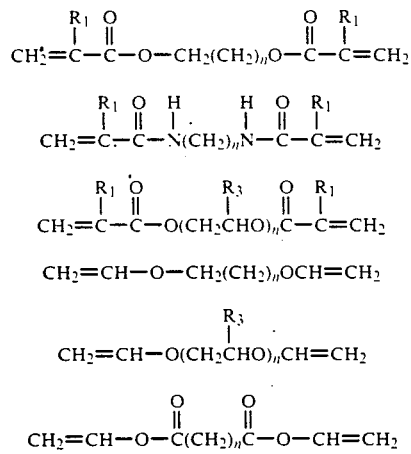

where:
R$_1$ may be hydrogen or an alkyl group
R$_3$ may be hydrogen or an alkyl group
n is a positive whole number from 1 to about 11 inclusive (The crosslinking monomers marked * are obviously also functional monomers).

Some other crosslinking monomers are recited in U.S. Pat. No. 4,052,343 col. 3, lines 22 through 41. The choice of suitable ethylenic crosslinking monomer obviously depends upon the mutual solubility of the chosen functional monomer(s), said crosslinking monomer(s) and any non-functional, non-crosslinking, polymerizable monomer diluent or polymeric diluent as well as on the relative copolymerization rates.

Examples of functional monomers belonging to the above groups a) through j) include:
a) dimethyl amino ethyl acrylate or methacrylate, tertiary butyl aminoethylmethacrylate
b) dimethyl amino propylacrylamide or methacrylamide
c) trimethyl ammonium ethyl acrylate or methacrylate salt (e.g. CAS#[5039-78-1].)
d) N-methacrylamido (or N-acrylamido) propyl-N,N,N-trimethyl ammonium salt (e.g. CAS#[5140-72-1]).
e) 2-vinyl pyridine, 4-vinyl pyridine, 2-methyl-5-vinyl pyridine
f) vinyl benzyl chlorides (ar-chloromethyl styrene)
g) N,N,N-trimethyl,-N-(vinylbenzyl) ammonium chloride
h) N,N-dimethyl-N-(vinylbenzyl) amine
i) N-methyl-2-vinyl pyridine, N-methyl-4-vinyl pyridine, N-methyl-2-methyl-5-vinyl pyridine
j) styrene, vinyl toluene, ethyl vinyl benzene Examples of crosslinking monomers belonging to the above groups k) through p) include:
k) ethylene glycol dimethacrylate or diacrylate, 1,10-decane diol diacrylate or dimethacrylate
l) methylene bis acrylamide or bis methacrylamide, dodecamethylene bis acrylamide or bis methacrylamide
m) diethylene glycol diacrylate or dimethacrylate
n) 1,4 butane diol divinyl ether
o) triethylene glycol divinyl ether
p) divinyl succinate, suberate or sebacate Although polymers of the above mentioned functional ethylenic monomers can be satisfactorily crosslinked by copolymerizing said monomers with one or more of the above ethylenic crosslinking monomers it should be understood that linear or partially crosslinked polymers of such functional monomers can be crosslinked (or further crosslinked) with other agents preferably in the substantial absence of unreactive, leachable diluents. For example polymers prepared from monomers of group f) can be crosslinked with amines such as methylamine, ethylene diamine, piperazine or polymeric primary, secondary or tertiary amines such as polyethylene polyamines or those prepared from the monomers of groups a), b), h), etc. Polymers prepared from monomers of the latter group can also be crosslinked, for example, with glycidyl acrylate or methacrylate, toluene diisocyanate, trimesoyl trichloride, trimellitic anhydride chloride, isophthaloyl dichloride, bisphenol A diglycidyl ether, tetraglycidyl methylene dianiline and the like. All such alternate procedures should be tailored to give in the final transport determining, laterally continuous region in the anion selective membrane, a water content of not more than about 5 mols per equivalent of anion exchange capacity both determined in about 0.01 N hydrochloric acid, preferably not less than about 2 mols and an anion exchange capacity preferably not less than about 0.5 milliequivalents per dry gram. In a preferred method the functional, diluting and crosslinking ethylenic monomers with little or no non-polymerizable, leachable diluent are caused to polymerize together (e.g. by heat and a free radical polymerization initiator or by ultraviolet light and a photosensitizer) in and on a woven or nonwoven fabric or microporous support and the resulting reinforced polymer sheet is substantially equilibrated with an aqueous acid having low ionic weight anions such as hydrochloric acid. (Such equilibration can be quite slow with particularly useful membranes prepared in accordance with this invention taking as much as 24 hours or more). The relative amounts of non-polymerizable, leachable diluents (if any), functional monomers, crosslinking monomers and any non-functional, non-crosslinking polymerizable monomer diluent and/or polymeric diluent are controlled to give an anion exchange membrane having at least a laterally continuous internal planar region, surface region or surface having a water content not exceeding about 5 mols per gram-equivalent of anion exchange capacity when in equilibrium with 0.01N hydrochloric acid. If such surface, surface region, laterally continuous internal plane and/or whole membrane has a high anion exchange capacity (milligram-equivalents per cubic centimeter) and is thin, then the membrane will also have a low electrical resistance per square centimeter. Preferred membranes according to this invention are asymmetric, i.e. one or both surface regions or a laterally continuous internal planar region comprise anion exchange material having water contents of not more than about 5 mols per gram-equivalent of anion exchange capacity, the remainder of the membrane adapted to have a low electrical resistance per square centimeter and to provide mechanical support for the surface region(s) or internal plane which determines the transport properties of the membrane.

DETAILED DESCRIPTION OF THE INVENTION

A variety of procedures have been used in the prior art to make anion selective membranes. According to one method a non-conjugated di-or tri-vinyl-containing monomer (such as one of those recited above), a monovinyl functional monomer (such as one of those listed above), a non-polymerizable, leachable diluent for such monomers and a polymerization initiator and/or photosensitizer (such as azo-bis-isobutyronitrile) with or without a viscosity modifier are mixed together and cast on or impregnated into a suitable fabric. The impregnated fabric is covered on both sides, for example by glass plates, to prevent loss of any volatile monomers or diluents and/or sorption of oxygen from the air. The monomers are copolymerized by heat and/or ultraviolet light. Suitable diluents are characterized by being good swelling agents for the resulting crosslinked copolymer thereby avoiding the formation of a macroporous (i.e. macroreticular) copolymer such as those which are the subject of U.S. Pat. No. 4,052,343. If the monovinyl functional monomer is one belonging to the above mentioned classes c), d), g) or i) then the resulting anion selective membrane is ready for electrodialysis after rinsing out the diluent, any unpolymerized monomers and the residues from the polymerization initiator and/or photosensitizer. If the monovinyl functional monomer is one belonging to the classes a), b), e) or h) then the polymerized sheet is treated with an alkylating agent such as methyl iodide before use. If the monovinyl functional monomer belongs to the class f) then the polymerizate is treated with an aminating agent (such as trimethylamine) before use. When said functional monomer belongs to class j) the polymerizate is treated with a haloalkylating agent (such as octyl bromomethyl ether and a Friedel-Crafts catalyst) and then with an aminating agent to complete the synthesis of the anion selective membrane.

The above method is used by Ionics, Incorporated (Watertown, Mass.) to make those of its anion selective membranes tabulated above (see e.g. U.S. Pat. No. 4,231,855).

According to a second method, a powdered thermoplastic film-forming polymer (such as the homo-or copolymers of vinyl chloride, vinyl fluoride, vinylidene chloride, vinylidene fluoride, ethylene and propylene or polymers such as styrene-butadiene copolymer, hydrogenated styrenebutadiene block copolymer, butyl rubber, chlorinated butyl rubber, poly chloroprene, sulfochlorinated polyethylene or acrylonitrile-styrenebutadiene terpolymer) is dissolved in the mixture of functional monomer, polymerization initiator and/or photosensitizer, crosslinking monomer and leachable diluent. (The latter is frequently a dialkyl phthalate). A suitable fabric is impregnated with such resulting paste, or organosol and the impregnated fabric processed as outlined in the description of the first method. Alternatively a film (including a fabric reinforced film) of the above mentioned film forming polymer is impregnated with the mixture of monomers, diluent and initiator and/or photosensitizer, the impregnated film then further processed as outlined above.

The above second method is used by Tokuyama Soda Company, Tokyo, Japan, and AMF Inc., U.S.A. to make their anion selective membranes tabulated above.

In accordance with a third method, a film of styrene-butadiene or styrene-isoprene copolymer is prepared on a suitable fabric and cyclized (i.e. crosslinked) with for example a solution of titanium tetrachloride in ether. The resulting polymerizate is equivalent to that prepared from a crosslinking monomer and a functional monomer belonging to class j) above and is further processed in the manner described above in connection with such class.

The above third method is used by Asahi Glass Company, Tokyo, Japan to make their anion selective membrane tabulated above. Similar anion selective membranes are made by functionalizing the film forming material directly in the absence of functional and crosslinking monomers, e.g. by sulfochlorination of polyethylene film (with or without fabric reinforcement) followed by amidation with an alkylene diamine. Such method is used by the Negey Institute, Israel.

A fourth method for making commercial anion selective membranes known in the prior art entails kneading or milling pulverized anion exchange resin into a film forming thermoplastic (including thermoplastic elastomers such as SBS or SIS block copolymers), calendering such mixture onto a suitable fabric or extruding the mixture into a sheet and subsequently bonding one or more such sheets to one or more fabrics. Commercially available granular anion exchange resins have water contents substantially in excess of about 5 mols per-equivalent of anion exchange capacity (see for example Table 16-4, "Perry's Chemical Engineer Handbook, 6th Edition" McGraw-Hill) NY, (1984)). Such heterogeneous membranes are made by Ionac Chem. Div., U.S.A.

Although it is not intended that this invention be limited by any theoretical considerations, it appears that the following comments may be useful. Hydrogen ions are apparently present in water as $H_3O^-$ (more likely $H_9O_4^-$, see e.g. E. Wicke et al., Z. physikal. Chem., (New Series), I (1954) p. 340). They apparently migrate by two mechanisms, one the migration of $H_9O_4^-$ ions as such and the other a prototropic exchange from one H₂O molecule to another, followed by rotation of the latter (see e.g. A. E. Stearn et. al., J. Chem. Phys. 5. 113(1937). $H_9O_4^+$ apparently has an intrinsic mobility (and therefore hydrated size) about the same as hydrated sodium ion (i.e. about 5.7 Angstroms in diameter with perhaps an average of 8.6 molecules of water per sodium ion) whereas chloride ion has an intrinsic mobility about 1.5 times greater (i.e. about 4.6 Angstroms in diameter and perhaps an average of about 3 molecules of water per chloride ion). (See e.g. W. Hayduk et. al. Am. Inst. Chem. Eng. J. 20,611 (1974) ). Therefore it appears that at least part of the effect found in this invention is due to tying up most of the water content of the membrane in water of hydration of the fixed ion exchanging groups and their counterions (e.g. chloride ion), making it difficult for protonic exchange to take place. Both the fixed ion exchanging groups and the water of hydration are probably not evenly distributed throughout an ion exchange material but it appears that below a critical (average) value of about 5 mols per equivalent of anion exchange a sufficient number of sites have low enough water of hydration to inhibit migration of hydrogen ion by protonic exchange. This is supported by the observation that hydrogen ion current "inefficiency" in the membranes of this invention is quite low even when the fixed ion exchange groups are adducts of $H^+$ and primary, secondary and/or tertiary amines. That such labile $H^+$ can be easily transported through amine type exchangers of the prior art can be seen from the high diffusion rate of strong acids through anion exchange membranes such as Tokuyama Soda's type AFN. It is likely also that below a critical water content of about 5 mols per equivalent of anion exchange capacity that the distribution of fixed charge density is sufficient to exclude $H_9O_4^+$ as co-ions, i.e. not bound as fixed charged groups. On the other hand the water content in mols per equivalent of anion exchange capacity and the anion exchange capacity must not be so low that chloride ion (and similar low ionic weight anions) are excluded from the laterally continuous hydrogen ion excluding region in the membrane. Such lower water content appears to be about 2 mols per equivalent of anion exchange capacity and such lower exchange capacity appears to be about 0.5 milliequivalents per dry gram of ion exchange material, unless such capacity can be arranged to be present in discrete channels or as a mosaic penetrating, perhaps tortuously, from one surface of such ion excluding region to the other.

It is apparently not possible generally to correlate a critical minimum concentration of crosslinking agent with anion exchange capacity though such correlation may be possible for a specific chemical composition. This impossibility appears to be due to inter alia: (a) in a mixture of crosslinking and non-crosslinking monomers the crosslinking monomers are less than 100% efficient (50% being typical) and at the same time, particularly at high concentrations of crosslinking monomers, there can be a large amount of entanglement of growing polymers, such entanglement performing in many respects as crosslinking (see e.g. K. Dusek, Coll. Czech. Chem. Commun. 27 (1962) p2841 et seq.); (b) the final polymer of monomer mixtures which gel at low degrees of monomer consumption are generally more stressed than those which gel later in the consumption process, the former therefore less able to withstand swelling stresses due to the ion exchange capacity; (c) in monomer mixtures in which crosslinking and non-crosslinking monomers are not incorporated into the growing polymer at equal rates the crosslinking can be present as inpenetrable clusters, the remaining regions being highly permeable; (d) specific monomers differ in their solubility parameters compared to water and therefore in their contribution to water absorbed in addition to that of the fixed ion exchange groups; (e) specific polymers differ in their affinity for polymer chains of the same general composition (including the possibility of local microcrystallinity) thus affecting the resistance to swelling pressure; (f) some polymers are more flexible or tough than others which at the same apparent degree of crosslinking are friable or brittle. Nevertheless it appears that the critical minimum ratio of crosslinking monomer to functional monomer is about 0.8 mols/mol in the case of anion exchange materials prepared from the above groups a) through d) on the one hand and groups k) through p) on the other in the substantial absence of leachable diluents.

Example 1

To a mixture of about 500 mls. of dimethyl amino ethyl methacrylate (about 3.0 gram mols) and about 500 mls. of ethylene glycol dimethacrylate (about 2.6 gram mols) is added about 5 gms. of 2,2'-azobis (2-methyl propionitrile). The resulting solution which is void of any nonpolymerizable solvents (i.e. leachable, unreactive dilutents) is poured into a Mylar lined tray, 10.5 × 11.5 inches. Glass plates and woven modacrylic fabric are added alternatively to form a package of twelve cloth layers. The package is heated in an oven to 80° C. for 12 hours. The solid, polymerized package is taken apart yielding twelve polymer-impregnated, cloth-backed sheets. The reinforced sheets are then placed in a 2 N Hydrochloric acid solution and allowed to swell until equilibrium is reached. They are found to have a water content of not more than about 5 mols per equivalent of anion exchange capacity when in equilibrium with about 0.01N hydrochloric acid. The anion exchange capacity is about 3 milliequivalents per dry gram of polymer. The glass transition temperature, if dry, is above 70° C. The ratio of crosslinking monomer to functional monomer was about 0.9 mols/mol.

Example 2

A three compartment electrodialysis test cell was used to determine the current efficiency of the membrane of Example 1 in comparison with those of the prior art when used in an acid solution. The cell comprised cathode and anode electrodes of platinum coated titanium located at the terminal ends of the cell with two membranes located therebetween and positioned from each other and from the electrodes with gasketed spacers to form liquid containing compartments. Thus the arrangement was as follows: the cathode electrode, the cathode compartment, the anion exchange membrane to be tested, the middle compartment, a commercially available type cation exchange membrane (Ionics, Inc., Watertown, Mass., U.S.A. CR61-AZL), the anode compartment and finally the anode electrode.

The membranes mounted in the test cell had an active membrane area of about 25 cm² and each compartment had a liquid volume of about 40 ml each and a cross-sectional active area of about 25 cm². The solution in the cell comprised 1N HCl in the cathode compartment, 0.5N HCl in the center compartment and 0.5N $H_2SO_4$ in the anode compartment. The solutions were stirred by use of a magentic stirrer and maintained at a temperature of 25° C. Each test run operated at 20 ma/cm² for a 20 minute period at which time the acid concentrations in the cell were determined by titration. The results were as follows:

| Anion Membrane | Current Efficiency |
|---|---|
| 1) Quaternary ammonium type as per U.S. Pat. No. 4,231,855 having a water content in excess of about 5 mols per equivalent anion exchange capacity when measuring about 0.01N hydrochloric acid. | 40.0% |
| 2) Non-quaternized tertiary amine of type 4,231,855 above containing non-polymerizable solvents during manufacture and having a water content in excess of about 5 mols per equivalent anion exchange capacity when measured in about 0.01N hydrochloric acid. | 67.8% |
| 3) Acid efficient membrane of the present invention - i.e. a non-quaternized tertiary amine type containing zero non-polymerized solvents during manufacture. | 80.2% |

It is readily noted from the above data that the membrane of the present invention is substantially more efficient over the membranes of the prior art when used in an acid environment.

Example 3

The procedure of Example 1 is repeated except after the solid, polymerized package is taken apart the sheets are dipped for a few minutes in a solution of 2% trimesoyl trichloride (the tri acid chloride of symmetrical benzene tricarboxylic acid) in hexane. After removal from such solution the hexane is allowed to evaporate from the sheets which are then heated in an oven at 80° C. for 20 minutes to form dense surface regions on the sheets; such regions having a water content less than about 5 mols per equivalent of anion exchange capacity. The sheets are equilibrated in 0.75 N hydrochloric acid for 24 hours and tested according to the procedure of Example 2. It is found that the current efficiency (transport number $t_4-$) for chloride ion is in excess of 80% and the current "inefficiency" (transport number $t_H+$) for hydrogen ion is less than 20%. The glass transition temperature, if any, of the membranes is above 70° C.

Example 4

To a mixture of about 500 mls methyl methacrylate (about 4.7 gram mols), about 250 mls of dimethyl aminoethyl methacrylate (about 1.5 gram mols) and about 250 mls of ethylene glycol dimethacrylate (about 1.3 gram mols) there are added about 5 gms. of 2,2'-azobis (2-methyl propionitrile). Fabric reinforced sheets are produced as described in Example 1. The sheets are soaked in 0.75 N hydrochloric acid solution for one week. They are found to have a water content of not more than about 5 mols per equivalent of anion exchange capacity when in equilibrium with about 0.01 N hydrochloric acid. The anion exchange capacity is about 1.5 milliequivalents per dry gram of polymer. The sheets are tested according to the procedure of Example 2. It is found that the current efficiency for transport of chloride ion is in excess of 80% and the current efficiency for hydrogen ion is less than 20%. Any glass transition temperature of the membrane is in excess of 70° C. The ratio of crosslinking monomer to functional monomer is about 0.9 mols/mol.

Example 5

The procedure of Example 1 is repeated except 3 gram mols of N,N-dimethyl amino propyl methacrylamide are substituted for the dimethyl aminoethyl methacrylate. The performance of the membranes so prepared is essentially the same, i.e. in the test of Example 2 the current efficiency for chloride is in excess of 80%. Any glass transition temperature is in excess of 70° C. The ratio of crosslinking monomer to functional monomer is about 0.9 mols/mol.

Example 6

A mixture of 150 parts by weight each of phthalic anhydride and triethanol amine is heated at about 100° C. until a clear liquid is obtained, then at about 185° C. until distillation essentially ceases, care being taken that a sample cooled to room temperature remains soluble in acetone. The cooled product is dissolved in acetone to make a syrup. The syrup is coated on PAN derived graphite fabric and dried, such coating and drying being repeated until the desired thickness is obtained. The coated fabric is sandwiched between weighted Teflon (TM) sheets and heated at 125° C. until the water content at room temperature in equilibrium with 0.01 normal hydrochloric acid is less than about 5 mols per equivalent of anion exchange capacity but preferably not less than about 2 mols. The resulting membrane is equilibrated in 0.75 normal hydrochloric acid and when tested in accordance with Example 2 is found to have a chloride transfer current efficiency in excess of 80 percent. Any glass transition temperature of the membrane is in excess of 70° C. The ratio of crosslinking monomer to functional monomer is 1. The time required at about 185° C. to obtain a condensate product which forms a syrup in acetone and the time required to cure the coated fabric at about 125° C. both vary from batch to batch apparently due to uncontrolled differences in the moisture content of the starting materials and imprecision in the temperatures. Therefore tests (which are well within the ability of those skilled in the art) must be made during the course of formation of the linear condensation product and curing tests on samples of the latter.

Example 7

A viscous fluid condensation product of epichlorohydrin and bisphenol A is mixed with tris (2-aminoethyl) amine in the ratio of about 25 parts condensation product solids to 1 part amine. The mixture is coated on woven glass fabric, sandwiched between Teflon (TM) sheets and heated at 85° C. until the water content at room temperature in equilibrium with 0.01 N hydrochloric acid is less than about 5 mols per equivalent of anion exchange capacity but preferably not less than about 2 mols. The resulting anion exchange membrane is equilibrated with 0.75 N hydrochloric acid and tested in accordance with Example 2. It is found that the current efficiency for transport of chloride ion is in excess of 80 percent. Dry glass transition temperature of the membrane is in excess of 70° C. The ratio of crosslinking monomer to functional monomer is 1. The time required to obtain cured products having water contents in the desired region varies from batch to batch apparently depending on differences in the linear condensation product of epichlorohydrin and bisphenol A, moisture content and imprecision in the curing temperature. Therefore curing tests (which are well within the ability of those skilled in the art) must be made on samples of each batch.

Example 8

The fluid mixture of condensation product and amine of Example 7 is coated on the surface of a microporous polysulfone sheet. The coated sheet is sandwiched between Teflon (TM) sheet (coated side down) and cured as in Example 7. When tested in accordance with Example 2 it is found that the efficiency for transport of chloride is in excess of about 80%. Any glass transition temperature of the ion exchange barrier is in excess of 70° C. The ratio of crosslinking monomer to functional monomer is 1. The time required to obtain cured products having water contents in the desired region varies from batch to batch apparently depending on differences in the linear condensation product of epichlorohydrin and bisphenol A, moisture content and imprecision in the curing temperature. Therefore curing tests (which are well within the ability of those skilled in the art) must be made on samples of each batch.

Example 9

A mixture of 75 parts of phthalic anhydride, 50 parts of maleic anhydride and 62 parts of ethylene glycol is heated at about 100° C. until a clear fluid is obtained and then at about 185° C. until distillation essentially ceases. The cooled product is dispersed in a mixture of styrene and 2-ethyl-5-vinyl pyridine to give a syrup containing about 135 grams of the vinyl pyridine per liter. 2.5 grams per liter each of 2-(tertiary butyl azo-)4-methoxy-2,4-dimethyl pentane nitrile and 2-(tertiary-butyl azo)-2,4-dimethyl pentanenitrile are added and the syrup is coated on Kevlar (TM) fabric. The coated fabric is sandwiched between Teflon (TM) sheets and heated overnight at 85° C. After cooling the membrane is stored for several days in 0.75 normal hydrochloric acid and then tested in the apparatus of Example 2. It is found that the current efficiency for transport of chloride ion is in excess of 80 percent. The water content in equilibrium with 0.01 normal hydrochloric acid is found to be less than about 5 mols per equivalent of anion exchange capacity. Any glass transition temperature of the membrane is in excess of 70° C.

Example 10

To a mixture of about 860 grams of paraaminostyrene (about 3 gram mols), about 100 grams diethylene glycol divinyl ether (about 0.6 gram mols) and 270 grams 95% divinyl benzene (about 2.0 gram mols) there is added about 25 grams each of 2-(tertiary butyl azo)-4-methoxy-2,4 dimethyl pentane nitrile and 2-(tertiary-butyl azo)-2,4-dimethyl pentanenitrile. The resulting solution (substantially void of leachable, unreactive diluents) is poured into a Mylar lined tray, 10.5×11.5 inches. Glass plates (treated with a release agent) and woven glass cloth (silane treated) are added alternatively to form a package of plate and cloth layers. The package is heated at 80° C. for 12 hours. After cooling but while still warm the package is dis-assembled. The glass cloth reinforced sheets are equilibrated in 0.75 normal hydrochloric acid. One sheet is tested in the apparatus of Example 2 and found to have a current efficiency for chloride transfer in excess of 80%. In equilibrium with 0.01 normal hydrochloric acid it has a water content in the range of from about 2 to about 5 mol per equivalent of anion exchange capacity. The anion exchange capacity is found to be about 4.2. Any glass transition temperature is in excess of 70° C. The ratio of crosslinking monomer to functional monomer is about 0.85.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

I claim:

1. An electrodialysis apparatus for recovering acid values containing at least one anion selective membrane having at least a laterally continuous portion of its thickness characterized by dense, crosslinked, polymeric, hydrocarbonaceous anion exchange material having in equilibrium with 0.01 normal hydrochloric acid at room temperature a water content of less than about 5 mols per equivalent of anion exchange capacity, said anion exchange material comprising addition products of compounds belonging to groups a) through k):

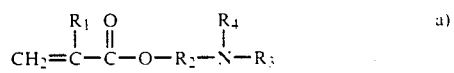

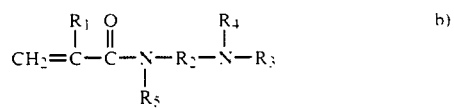

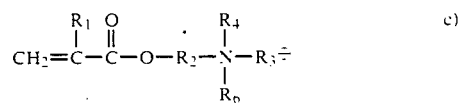

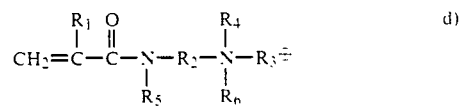

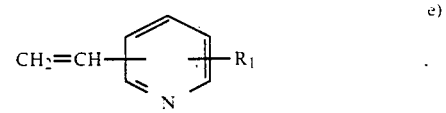

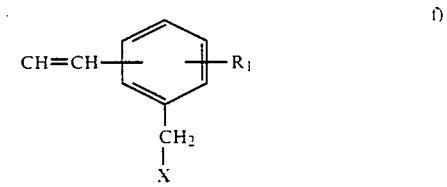

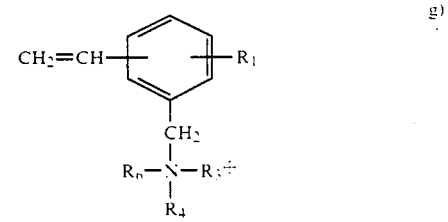

-continued h) 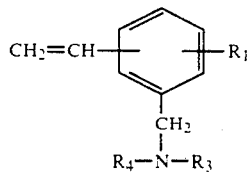

i) 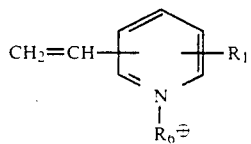

j) 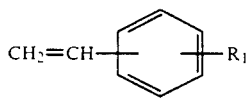

k) aminostyrenes, tertiary butyl N-vinyl carbamate, N,N-dimethyl allylamine, 2-vinyl-4,6-diamino-5-triazine, diallylamine, dimethyl diallyl ammonium chloride, divinyl pyridines where $R_1$ is hydrogen or an alkyl or alkoxy moiety;
$R_2$ is an alkyl group;
$R_3$ and $R_4$ are individually hydrogen and/or an alkyl group;
$R_5$ is hydrogen or an alkyl or alkoxy moiety;
$R_6$ is hydrogen and/or an alkyl group;
x is a halide moiety.

2. The apparatus of claim 9 in which said anion exchange material contains anion exchangeable groups present to the extent of from about 0.5 to about 5 milligram equivalents per dry gram of said anion exchange material and are selected from the group consisting of primary, secondary, tertiary and quaternary amines, guanidine, dicyandiamidine, sulfonium and phosphonium having ionization constants in the base form of at least about $10^{-12}$.

3. Apparatus according to claim 9 in which such anion exchange material is rendered insoluble in the substantial absence of unreactive leachable diluents.

4. Apparatus according to claim 9 in which said anion exchange material is a polymer comprising a mixture of a cross-linking monomer and a bifunction monomer wherein the ratio of crosslinking monomer to functional monomer is in excess of about 0.8 mols/mol.

5. Apparatus according to claim 1 in which said anion exchange material comprises a cross-linked copolymer of an eiphalohydrin.

6. Apparatus according to claim 1 in which said anion exchange material comprises a crosslinked polyester.

* * * * *

UNITED STATES PATENT AND TRADEMARK OFFICE
CERTIFICATE OF CORRECTION

PATENT NO. : 5,045,171

DATED : September 3, 1991

INVENTOR(S) : Russell J. MacDonald

It is certified that error appears in the above-identified patent and that said Letters Patent is hereby corrected as shown below:

Col. 16, Claims 2, 3 and 4, line 1, each occurence change "9" to

--1--.

Signed and Sealed this

Twenty-second Day of December, 1992

Attest:

DOUGLAS B. COMER

Attesting Officer       Acting Commissioner of Patents and Trademarks